(12) United States Patent
Jeong

(10) Patent No.: US 12,497,005 B2
(45) Date of Patent: Dec. 16, 2025

(54) APPARATUS AND METHOD FOR ASSISTING DRIVING OF HOST VEHICLE

(71) Applicant: HL Klemove Corp., Incheon (KR)

(72) Inventor: JinHwan Jeong, Seoul (KR)

(73) Assignee: HL Klemove Corp., Incheon (KR)

( * ) Notice: Subject to any disclaimer, the term of this patent is extended or adjusted under 35 U.S.C. 154(b) by 99 days.

(21) Appl. No.: 18/228,867

(22) Filed: Aug. 1, 2023

(65) Prior Publication Data

US 2024/0051504 A1 Feb. 15, 2024

(51) Int. Cl.
  *B60T 7/22* (2006.01)
  *G06V 20/56* (2022.01)
  *G06V 20/58* (2022.01)

(52) U.S. Cl.
  CPC .............. *B60T 7/22* (2013.01); *G06V 20/584* (2022.01); *G06V 20/588* (2022.01); *B60T 2210/32* (2013.01)

(58) Field of Classification Search
  None
  See application file for complete search history.

(56) References Cited

U.S. PATENT DOCUMENTS

| | | | |
|---|---|---|---|
| 8,666,651 B2* | 3/2014 | Kumabe | G08G 1/164 701/301 |
| 9,989,966 B2* | 6/2018 | Wei | B60W 60/00274 |
| 10,351,060 B2* | 7/2019 | Ha | B62D 15/0285 |
| 10,358,083 B2* | 7/2019 | Suzuki | B60Q 1/04 |
| 10,705,530 B2* | 7/2020 | Aoki | G05D 1/0272 |
| 11,948,451 B2* | 4/2024 | Sakurada | G06V 40/25 |
| 2015/0084791 A1* | 3/2015 | Jang | G08G 1/07 340/944 |
| 2018/0151075 A1* | 5/2018 | Claesson | H04W 84/02 |
| 2019/0033876 A1 | 1/2019 | Aoki | |
| 2019/0146519 A1* | 5/2019 | Miura | B60W 30/09 701/28 |
| 2021/0217304 A1* | 7/2021 | Shino | G08G 1/123 |

FOREIGN PATENT DOCUMENTS

| | | |
|---|---|---|
| CN | 105151045 A | 12/2015 |
| JP | 2006-160192 A | 6/2006 |
| JP | 2007-233864 A | 9/2007 |

OTHER PUBLICATIONS

The Office Action dated Sep. 16, 2025 of the corresponding KR Application.

* cited by examiner

*Primary Examiner* — Todd Melton
(74) *Attorney, Agent, or Firm* — Harvest IP Law, LLP

(57) ABSTRACT

The present disclosure relates to a system for controlling proper departure of a vehicle on a crosswalk using a parking assistance system, and provides a system for controlling proper departure of a vehicle on a crosswalk, the system comprising: a surround view camera used for parking assistance by photographing objects from all directions of the vehicle; a recognition part for recognizing a crosswalk, a color of a traffic light and a pedestrian from an image captured by the surround view camera; and a controller configured to brake the host vehicle when the crosswalk is recognized and the color of the traffic light is recognized as red, and then determine whether to release braking of the vehicle according to the color of the traffic light and whether the pedestrian is recognized.

19 Claims, 8 Drawing Sheets

APPARATUS AND METHOD FOR ASSISTING DRIVING OF HOST VEHICLE

CROSS-REFERENCE TO RELATED APPLICATION

The present application claims the benefit of priority to Korean Patent Application No. 10-2022-0099008, filed on Aug. 9, 2022 in the Korean Intellectual Property Office, the disclosure of which is incorporated herein by reference in its entirety.

BACKGROUND

1. Technical Field

The present disclosure relates to an apparatus and method for assisting driving of a host vehicle, and more particularly, to a system and method for controlling proper departure of a crosswalk using a parking assistance system provided in a host vehicle.

2. Discussion of Related Art

As the use of automobiles rapidly increases in modern society, the number of deaths or injuries caused by automobile accidents has reached tens of millions every year. Accordingly, in order to reduce the life and economic losses caused by traffic accidents, various automobile technologies such as advanced driver assistance systems (ADAS) for preventing accidents with advanced detection sensors and intelligent imaging equipment have been developed.

These advanced driver assistance systems include forward collision warning (FCW) technology, automatic cruise control (ACC) technology, lane change assistance technology, lane departure waring technology, and parking assistance technology.

Meanwhile, in the case of urban areas, because of the large amount of traffic, there are frequent locations where vehicles need to stop, such as stop lines or crosswalks. In addition, if a driver departs unauthorizedly after stopping at a crosswalk without recognizing traffic lights and pedestrians, fines may be imposed due to traffic signal violations and may lead to human accidents.

FIG. 1 is a diagram illustrating a left and right angle of view of a front camera provided on a windshield of a vehicle, and FIG. 2 is a diagram illustrating a vertical angle of view of a front camera provided on a windshield of a vehicle.

As illustrated in FIG. 1, the front camera 11 provided on the windshield of the vehicle 10 has been developed with a narrow angle in order to photograph an object generally located even at a long distance. Accordingly, when the vehicle 10 stops in front of a crosswalk 20, because the left and right angles of view are narrow, there is a problem in that it is difficult to detect a pedestrian 30 approaching from outside the vehicle 10.

In addition, as illustrated in FIG. 2, since the front camera 11 has a narrow vertical angle of view, when the vehicle stops past a stop line in front of the crosswalk 20, the front camera 11 has a limit in recognizing a traffic light 40, and accordingly, there is a problem in that a traffic accident may occur because the driver may depart unauthorizedly without recognizing the signal change of the traffic light 40.

SUMMARY

The present disclosure is directed to providing a system and method for controlling proper departure of a vehicle using a parking assistance system provided in the vehicle to prevent an unauthorized departure such as a signal violation or a rapid start in a state where the vehicle is stopped on a crosswalk.

The technical problems to be achieved in the present disclosure are not limited to the technical problems mentioned above, and other technical problems not mentioned will be clearly understood by those of ordinary skill in the art from the following description.

In order to achieve the above objects, the present disclosure relates to a system for controlling proper departure of a vehicle on a crosswalk using a parking assistance system, and provides a system for controlling proper departure on a crosswalk, the system comprising: a surround view camera used for parking assistance by photographing objects from all directions of the vehicle; a recognition part for recognizing a crosswalk, a color of a traffic light and a pedestrian from an image captured by the surround view camera; and a controller configured to brake the vehicle when the crosswalk is recognized and the color of the traffic light is recognized as red, and then determine whether to release braking of the vehicle according to the color of the traffic light and whether the pedestrian is recognized.

Here, the controller may drive the surround view camera when the parking assistance system is in an off state and the vehicle travels at a first reference speed or less.

In addition, the system for controlling proper departure of the vehicle on a crosswalk of the present disclosure may further include a display for displaying an image captured by the surround view camera when assisting parking of the vehicle.

In addition, the controller may maintain the display in an off state when the parking assistance system is in an off state and the vehicle travels at a first reference speed or less.

In addition, the controller may drive the display when the vehicle is braked.

In addition, the controller may output a warning through the display or a speaker when the pedestrian is recognized as approaching the vehicle after the vehicle is braked.

In addition, the controller may limit a speed of the vehicle to a second reference speed when the color of the traffic light is recognized as green and the pedestrian is recognized after braking the vehicle.

Here, the second reference speed may be less than the first reference speed.

In addition, the controller may maintain braking of the vehicle when the color of the traffic light is recognized as red or the pedestrian is recognized after braking the vehicle.

In addition, the controller may release braking of the vehicle when the color of the traffic light is recognized as green and the pedestrian is not recognized after braking the vehicle.

In addition, the controller may include a distance calculation part configured to calculate a braking distance from the vehicle to the crosswalk when the crosswalk is recognized by the recognition part.

Here, the distance calculation part may calculate the braking distance when the crosswalk is recognized and the color of the traffic light is recognized as red or yellow.

In addition, the controller may further include a braking force calculation part configured to calculate a braking time point of the vehicle or a braking force of the vehicle based on the braking distance.

In addition, the controller may brake the vehicle based on the braking time point or the braking force.

In addition, the present disclosure relates to a method for controlling proper departure of a vehicle on a crosswalk using a parking assistance system including a surround view camera used for parking assistance by photographing objects from all directions of the vehicle, and provides a method for controlling proper departure of a vehicle on a crosswalk, the method comprising: identifying a driving state of the parking assistance system and a driving speed of the vehicle; driving the surround view camera when the parking assistance system is in an off state and the vehicle travels at a first reference speed or less; braking the vehicle when a crosswalk is recognized and a color of a traffic light is recognized as red from an image captured by the surround view camera; recognizing a pedestrian from the image captured by the surround view camera; and determining whether to release braking of the vehicle according to the color of the traffic light and whether the pedestrian is recognized.

Here, the determining whether to release braking of the vehicle may include limiting the speed of the vehicle to a second reference speed when the color of the traffic light is recognized as green and the pedestrian is recognized after braking the vehicle.

In addition, the determining whether to release braking of the vehicle may include maintaining braking of the vehicle when the color of the traffic light is recognized as red or the pedestrian is recognized after braking the vehicle.

In addition, the determining whether to release braking of the vehicle may include releasing braking of the vehicle when the color of the traffic light is recognized as green and the pedestrian is not recognized after braking the vehicle.

According to the present disclosure, it can prevent traffic accidents and protect pedestrians by preventing unauthorized departure such as signal violation or sudden start while the vehicle is stopped at a crosswalk.

In addition, according to the present disclosure, it recognizes a crosswalk situation using the surround view camera provided in the parking assistance system in order to prevent unauthorized departure of the vehicle at the crosswalk, so it is possible to reduce costs associated with the provision of a separate unauthorized departure prevention device.

The effects of the present disclosure are not limited to those mentioned above, and other effects not mentioned will be clearly understood by those of ordinary skill in the art from the following description.

DETAILED DESCRIPTION OF THE EMBODIMENTS

Figure 1:
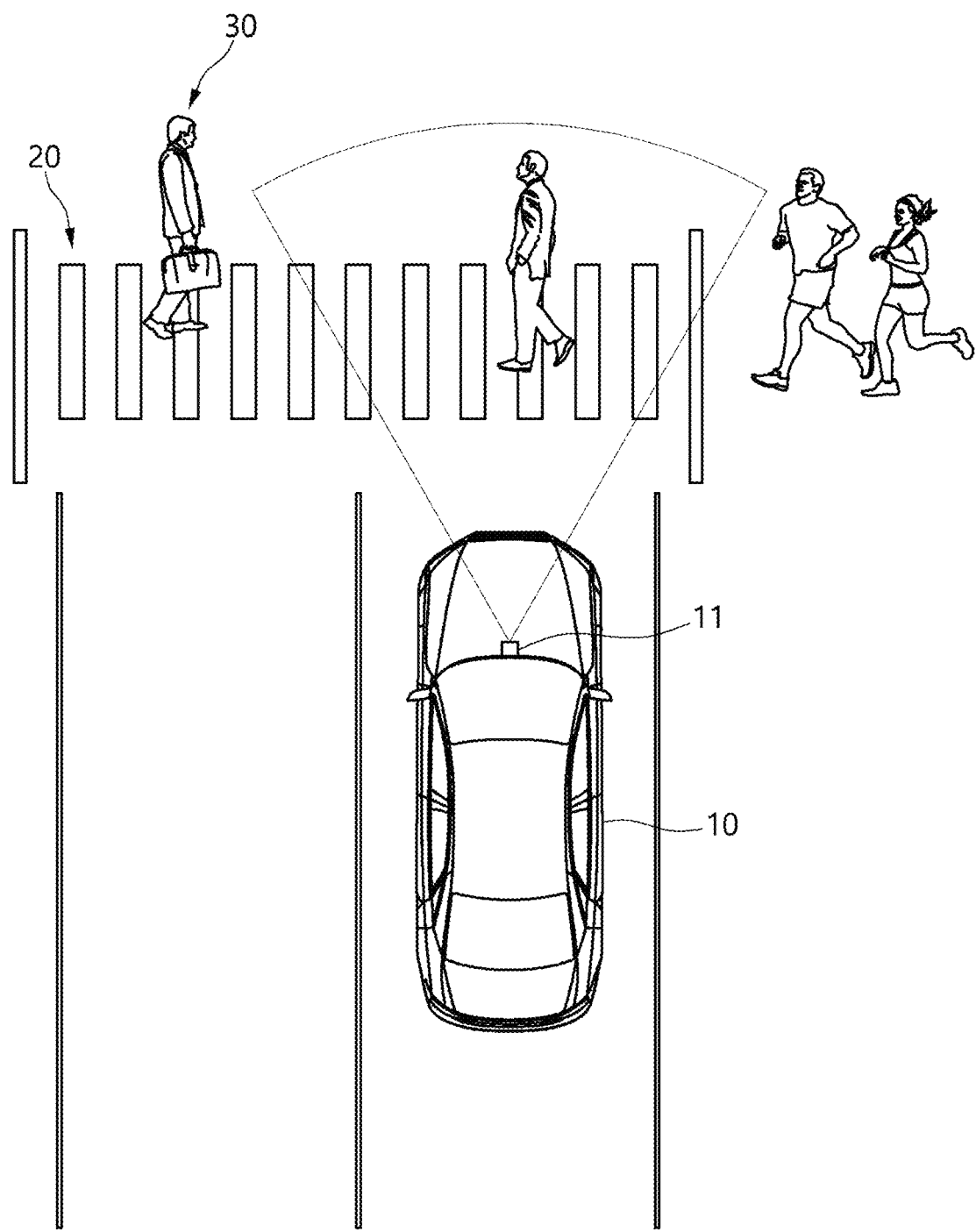
FIG. 1 is a diagram illustrating a left and right angle of view of a front camera provided on a windshield of a vehicle.
Figure 2:
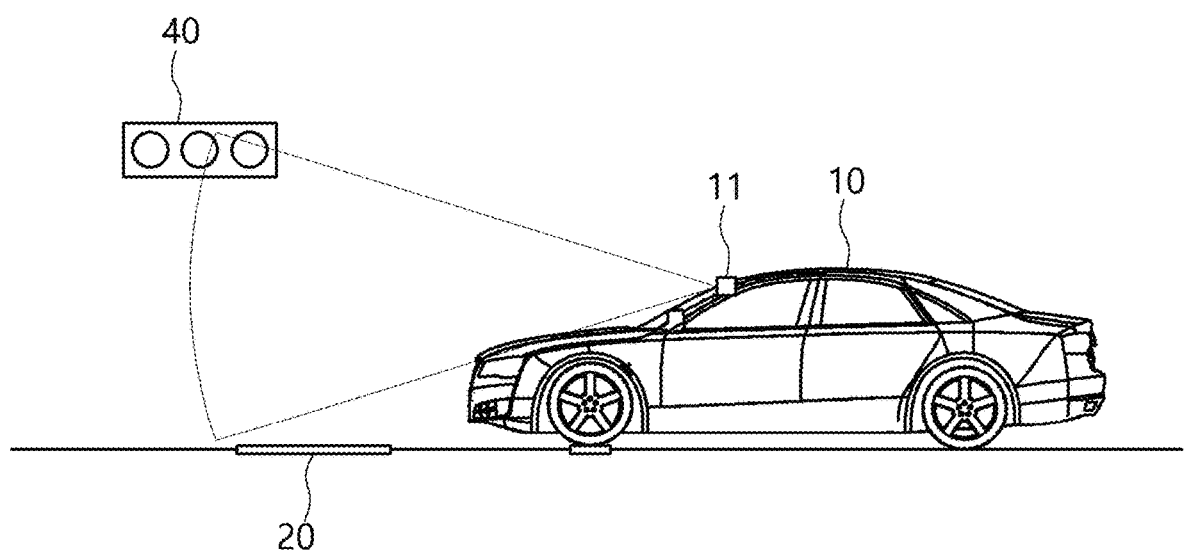
FIG. 2 is a diagram illustrating a vertical angle of view of a front camera provided on a windshield of a vehicle.

Hereinafter, exemplary embodiments of the present disclosure will be described in detail so that those of ordinary skill in the art can readily implement the present disclosure with reference to the accompanying drawings. The present disclosure may be embodied in many different forms and are not limited to the embodiments set forth herein. In the drawings, parts unrelated to the description are omitted for clarity of description of the present disclosure. Throughout the specification, like reference numerals denote like elements.

It is understood that the terms "comprise" or "have" when used in this specification, are intended to specify the presence of stated features, integers, steps, operations, elements, components and/or a combination thereof but not preclude the possibility of the presence or addition of one or more other features, integers, steps, operations, elements, components, or a combination thereof.

Figure 3:
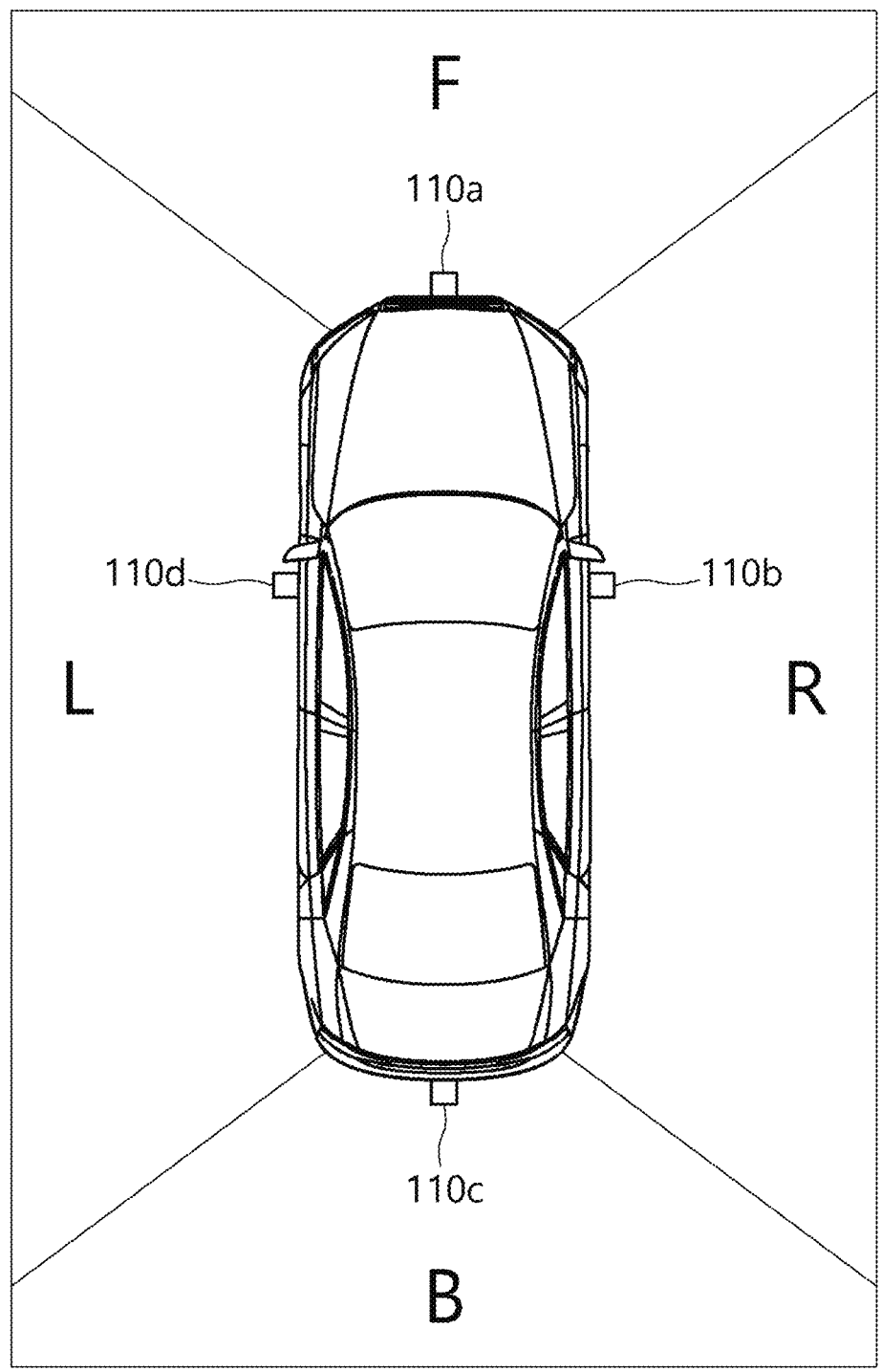
FIG. 3 is a diagram illustrating a vehicle equipped with a parking assistance system according to an embodiment of the present disclosure.
Figure 4:
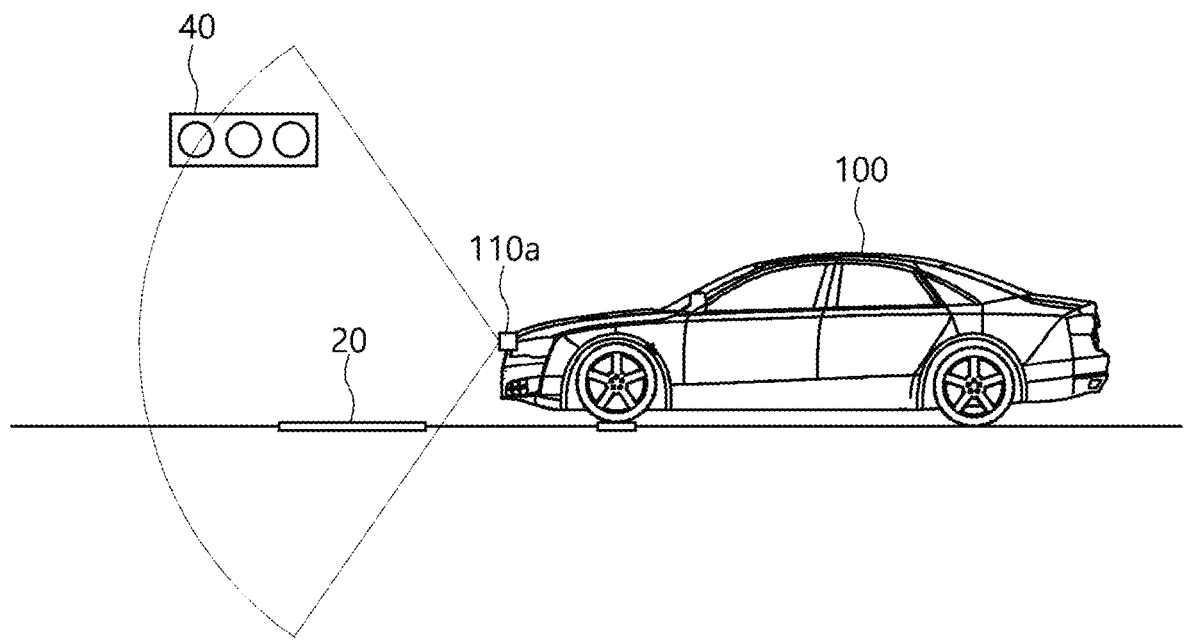
FIG. 4 is a diagram illustrating a vertical angle of view of a surround view camera according to an embodiment of the present disclosure.
Figure 5:
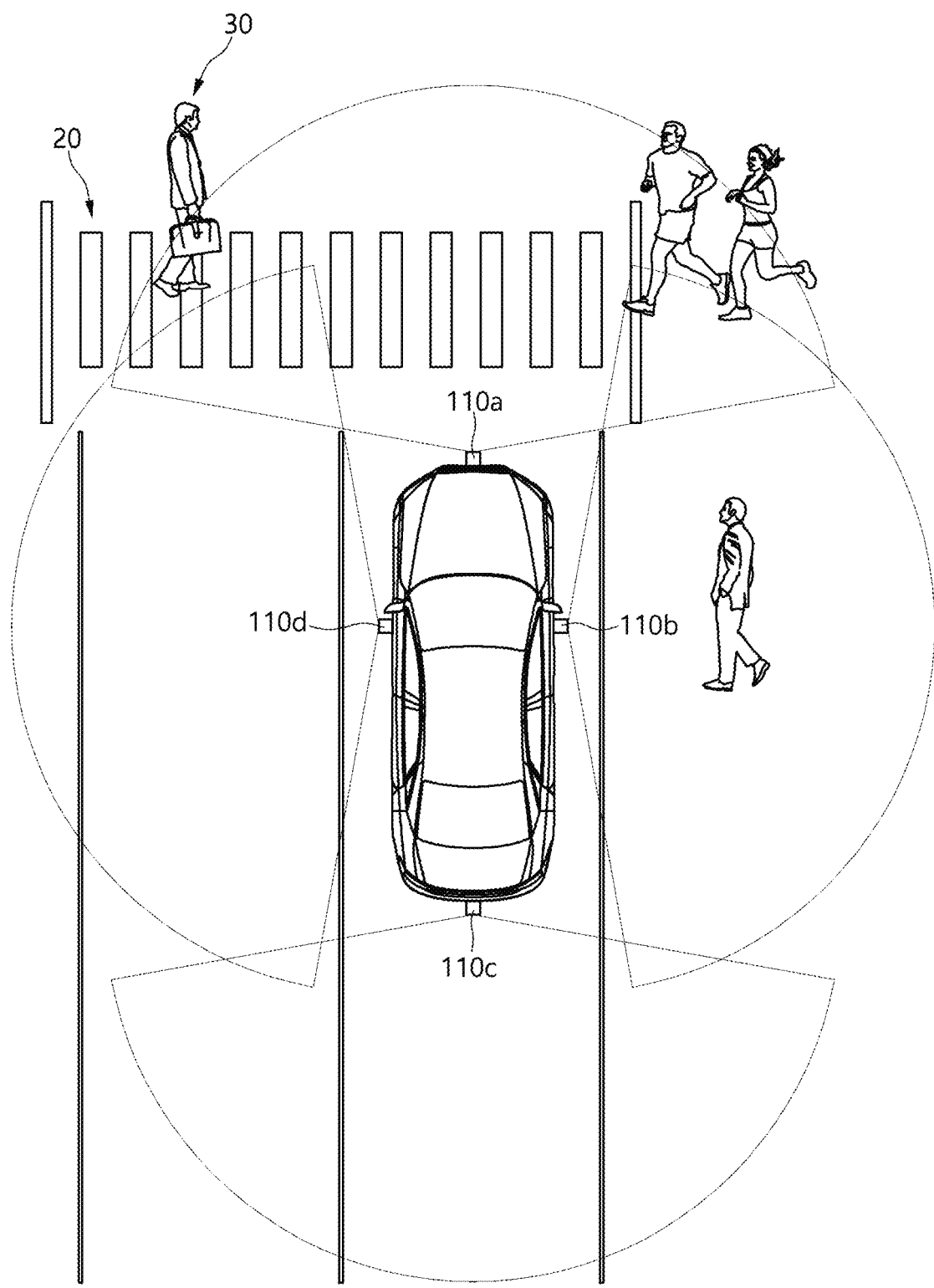
FIG. 5 is a diagram illustrating an omnidirectional angle of view of a surround view camera according to an embodiment of the present disclosure.

FIG. 3 is a diagram illustrating a vehicle 100 equipped with a parking assistance system according to an embodiment of the present disclosure, FIG. 4 is a diagram illustrating a vertical angle of view of a surround view camera according to an embodiment of the present disclosure, and FIG. 5 is a diagram illustrating an omnidirectional angle of view of a surround view camera according to an embodiment of the present disclosure.

Referring to FIG. 3, the vehicle 100 equipped with a parking assistance system may include a surround view camera 110 including a plurality of cameras 110a to 110d.

Here, the front camera 110a may be provided in front of the vehicle 100 such as a front bumper, the right camera 110b may be provided in a right side of the vehicle 100 such as a right side mirror, the rear camera 110c may be provided in rear of the vehicle 100 such as a rear bumper, and the left camera 110d may be provided in a left side of the vehicle 100 such as a left side mirror.

Here, the surround view camera 110 is illustrated and described as being provided one by one in each direction, but is not limited thereto, and may include a plurality of cameras. In particular, since the field of view of the right camera 110b and the left camera 110c is limited depending on the installation location, a plurality of cameras may be installed in a plurality of locations.

In addition, the parking assistance system may include a brightness control logic for matching a bird's eye view, and may include a parking guide that changes a view based on a gear position of the vehicle 100.

Here, the parking assistance system may assist the driver to visually check the lines around a parking space and a position of the vehicle 100 with respect to objects adjacent to the vehicle 100.

Through this, the driver may better understand the surroundings of the vehicle 100 through a virtual bird's eye view from above the vehicle 100, and may be assisted to park into the parking space more easily.

The system for controlling proper departure of a vehicle on a crosswalk according to an embodiment of the present disclosure may prevent unauthorized departure of the vehicle 100 in a state where the vehicle 100 is stopped in the crosswalk 20 using the above-described parking assistance system. That is, the parking assistance system is used to be driven by the driver's selection to assist the driver's parking during the parking of the vehicle 100, and is used to prevent unauthorized departure of the vehicle 100 from the crosswalk 20 by maintaining an off state while driving and then being driven again when a crosswalk is recognized.

Referring to FIG. 4, since the front camera 110*a* of the surround view camera 110 has a vertical angle of view corresponding to the height of a traffic light 40, it can photograph the entire traffic light 40 corresponding to the installation position of the traffic light 40. Accordingly, the system for controlling proper departure of a vehicle on a crosswalk according to an embodiment of the present disclosure may recognize the color of the traffic light 40 based on the photographed image of the traffic light 40 and prevent unauthorized departure of the vehicle from the crosswalk 20.

In addition, referring to FIG. 5, since the front camera 110*a*, the right camera 110*b*, the rear camera 110*c*, and the left camera 110*d* of the surround view camera 110 have angles of view corresponding to all directions of the vehicle 100, they may photograph objects from all directions of the vehicle 100, including a crosswalk 20 and a pedestrian 30. Accordingly, the system for controlling proper departure of a vehicle on a crosswalk according to an embodiment of the present disclosure may recognize the crosswalk 20 and the pedestrian 30 based on images taken from all directions and prevent unauthorized departure of the vehicle from the crosswalk 20.

Figure 6:
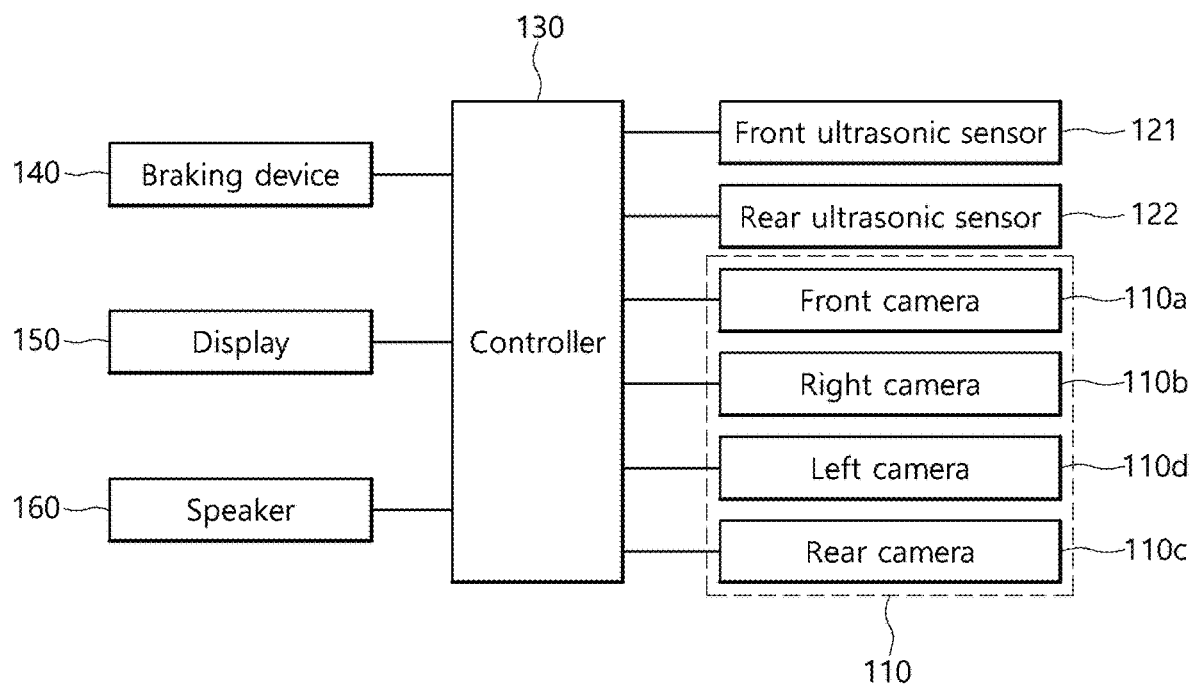
FIG. 6 is a block diagram of a system for controlling proper departure of a vehicle on a crosswalk according to an embodiment of the present disclosure.
Figure 7:
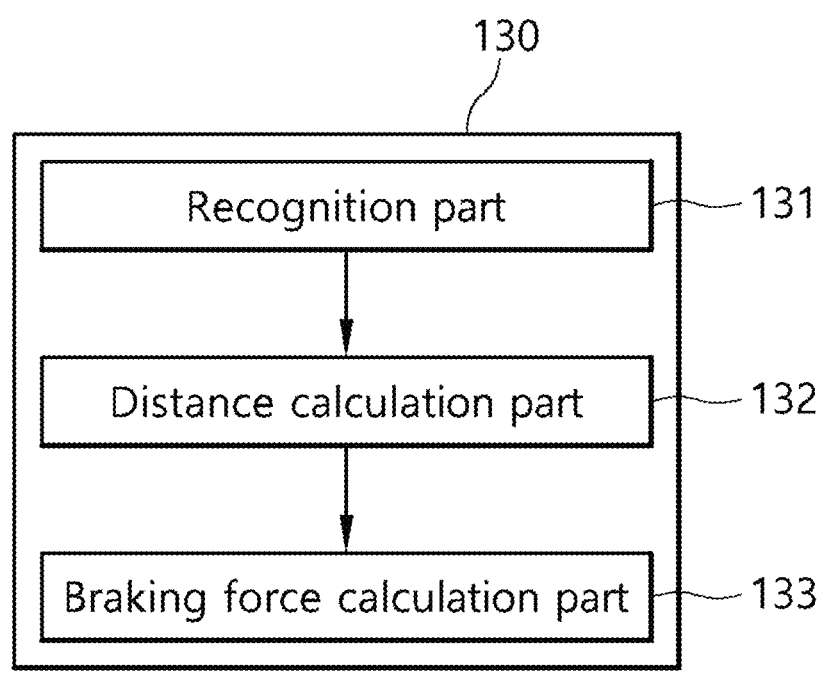
FIG. 7 is a block diagram of a controller of a system for controlling proper departure of a vehicle on a crosswalk according to an embodiment of the present disclosure.

FIG. 6 is a block diagram of a system for controlling proper departure of a vehicle on a crosswalk according to an embodiment of the present disclosure, and FIG. 7 is a block diagram of a controller of a system for controlling proper departure of a vehicle on a crosswalk according to an embodiment of the present disclosure.

Referring to FIG. 6, the system for controlling proper departure of a vehicle on a crosswalk according to an embodiment of the present disclosure may include a surround view camera 110, a controller 130, a braking device 140, a display 150, and a speaker 160.

As described above, the surround view camera 110 may include a front camera 110*a*, a right camera 110*b*, a rear camera 110*c*, and a left camera 110*d*.

Furthermore, the system for controlling proper departure of a vehicle on a crosswalk according to an embodiment of the present disclosure may further include a front ultrasonic sensor 121 and a rear ultrasonic sensor 122 for sensing objects located in front and rear of the vehicle 100 using ultrasonic waves.

The surround view camera 110 may capture objects from all directions (e.g., front, rear, left and right directions, but not limited thereto) of the vehicle 100 and use them for parking assistance, and may prevent unauthorized departure of the vehicle 100 from a crosswalk 20 when the crosswalk is recognized.

Referring to FIG. 7, showing an exemplary embodiment of the present disclosure, the controller 130 may include a processor (e.g., computer, microprocessor, CPU, ASIC, circuitry, logic circuits, etc.) and an associated non-transitory memory storing software instructions which, when executed by the processor, provides the functionalities of a recognition part 131, a distance calculation part 132, and a braking force calculation part 133. Herein, the memory and the processor may be implemented as separate semiconductor circuits. Alternatively, the memory and the processor may be implemented as a single integrated semiconductor circuit. The processor may embody one or more processor(s).

The recognition part 131 of the controller 130 may recognize a crosswalk 20, a color of a traffic light 40 and a pedestrian 30 from an image captured by the surround view camera 110.

Here, the red lighting signal of the traffic light 40 means a stop signal of the vehicle 100, the green lighting signal of the traffic light 40 means a driving signal of the vehicle 100, and the yellow flickering signal means a stop preparation signal of the vehicle 100.

The recognition part 131 may recognize the color of the traffic light 40 using one of an RGB model, an HSV model, and a YCbCr model.

Here, when the RGB model is used, the range of each color region R (red), G (green), and B (blue) are preset, and the recognition part 131 may determine whether the color of the traffic light 40 is red, green, or yellow by comparing the R, G, and B values of the traffic light 40 with the preset R, G, and B values.

In general, the crosswalk 20 is formed using white luminescent paint, and thus, since it reflects light, its brightness and chroma are higher than those of other road surfaces. Therefore, the recognition part 131 may detect the crosswalk 20 by using the brightness and chroma of the image captured by the surround view camera 110. That is, the recognition part 131 recognizes as the crosswalk 20 a region where the integrated value of the brightness and the chroma in the image is equal to or greater than a predetermined value.

Meanwhile, the recognition part 131 may recognize the crosswalk 20 by detecting an edge in the image. Specifically, the recognition part 131 may perform a differential operation to detect an edge, and may calculate a horizontal gradient and a vertical gradient of the front image by using, for example, a Sobel differential operator. Then, the recognition part 131 binarizes the horizontal gradient image and the vertical gradient image into 0 and 1.

That is, the recognition part 131 binarizes the horizontal gradient image and the vertical gradient image by setting a point where the gradient value is equal to or greater than a preset threshold value to 1 and a point where the gradient value is equal to or less than the preset threshold value to 0 in the horizontal gradient image and the vertical gradient image, thereby generating a horizontal binarized image and a vertical binarized image. Then, the recognition part 131 may recognize the crosswalk 20 by detecting an edge in the horizontal gradient image.

Meanwhile, the recognition part 131 may be included in the controller 130, but is not limited thereto and may be provided as a separate module.

The controller 130 may brake the vehicle 100 when the crosswalk 20 is recognized and the color of the traffic light 40 is recognized as red.

Specifically, when at least one of the crosswalk 20 and the traffic light 40 is recognized by the recognition part 131, the distance calculation part 132 may calculate a braking distance from the vehicle 100 to the crosswalk 20.

Here, the distance calculation part 132 of the controller 130 may calculate the braking distance when the crosswalk 20 is recognized and the color of the traffic light 40 is recognized as red or yellow.

The braking force calculation part 133 of the controller 130 may calculate a braking time point of the vehicle 100 or a braking force of the vehicle 100 based on the braking distance calculated by the distance calculation part 132 and a speed of the vehicle 100.

Accordingly, the controller 130 may control the braking device 140 based on the braking time point or the braking force to brake the vehicle 100.

This is to stably stop the vehicle 100 before reaching the crosswalk 20 by braking the vehicle 100 by reflecting the recognition time of the traffic light 40 and the speed of the vehicle 100 since the distance from which the color of the traffic light 40 may be recognized is different according to the surrounding environment such as the road topography and the position of the traffic light 40, and the braking distance is different according to the speed of the vehicle 100.

After the vehicle 100 is stopped, the controller 130 may determine whether to release the braking of the vehicle 100 according to the color of the traffic light 40 and whether a pedestrian 30 is recognized.

Specifically, the controller 130 may drive the surround view camera 110 when the parking assistance system is in an off state and the vehicle 100 travels at a first reference speed (e.g., 10 kph) or less. Here, that the parking assistance system is turned off means that the vehicle 100 is traveling, and the meaning that the vehicle 100 is traveling at a relatively low speed below a reference speed means that the driver recognizes the crosswalk 20 and is decelerating. In such a situation, the controller 130 drives the surround view camera 110 and uses it to prevent unauthorized departure of the vehicle from the crosswalk 20.

The braking device 140 may brake the vehicle 100 under the control of the controller 130. And, the display 150 may display an image captured by the surround view camera 110 when assisting parking of the vehicle 100.

The display 150 may output a processing state and a result according to an operation of the controller 130. For example, the display 150 may display a parking space search result and output a voice signal (a speaker signal) through the speaker 160.

In addition, the display 150 may be implemented as a touch screen coupled with a touch sensor and may be used as an input device as well as an output device. Here, as the touch sensor, a touch film or a touchpad, or the like may be used.

In addition, the display 150 may include at least one of a liquid crystal display (LCD), a thin film transistor-liquid crystal display (TFT LCD), an organic light-emitting diode (OLED) display, a flexible display, a three-dimensional (3D) display, a transparent display, a head-up display (HUD), a touch screen, and a cluster.

As described above, when the parking assistance system is in the off state and the speed of the vehicle 100 is lower than or equal to the first reference speed, the surround view camera 110 is driven, and when an image captured by the surround view camera 110 is displayed on the display 150 during driving of the vehicle 100, the driver may be distracted. That is, the image captured by the surround view camera 110 is not displayed on the display 150, but is instead transmitted to the recognition part 131 and used to recognize a crosswalk 20, a pedestrian 30, and a traffic light 40.

Accordingly, when the parking assistance system is in the off state and the vehicle 100 travels at the first reference speed or less, the controller 130 may maintain the display 150 in the off state.

On the other hand, when the crosswalk 20 is recognized and the color of the traffic light 40 is recognized as red, the vehicle 100 is braked, and in this case, even when the image captured by the surround view camera 110 is displayed on the display 150, there is no concern of the driver being distracted, but rather, there is an advantage of being able to provide the driver with a surrounding situation in all directions of the vehicle 100 during stopping.

Accordingly, when the vehicle 100 is braked, the controller 130 may drive the display 150.

When a pedestrian 30 is recognized as approaching the vehicle 100 after the vehicle 100 is braked, the controller 130 may output a warning through the display 150 or the speaker 160.

When the color of the traffic light 40 is recognized as green and a pedestrian 30 is recognized after the vehicle 100 is braked, the controller 130 may limit the speed of the vehicle 100 to a second reference speed (e.g., 5 kph). Here, the second reference speed may be less than the first reference speed, which is a driving condition of the surround view camera 110.

Although the vehicle 100 can be driven when the color of the traffic light 40 is recognized as green, but nevertheless, when there is a pedestrian 30 around the vehicle 100, especially on the crosswalk 20, this is to protect the pedestrian 30 by limiting the speed of the vehicle 100.

The controller 130 may maintain braking of the vehicle 100 if the color of the traffic light 40 is recognized as red or the pedestrian 30 is recognized after the vehicle 100 is braked.

Since the vehicle 100 must still remain in a stopped state if the color of the traffic light 40 is recognized as red, and a pedestrian 30 may be determined to be around the vehicle 100 if the pedestrian 30 is recognized, especially on the crosswalk 20, the pedestrian 30 may be protected by preventing unauthorized departure of the vehicle 100 due to the carelessness of the driver by maintaining the vehicle 100 in a stopped state.

The controller 130 may release the braking of the vehicle 100 if the color of the traffic light 40 is recognized as green and the pedestrian 30 is not recognized after the vehicle 100 is braked.

This is to allow the driver to drive the vehicle 100 again by releasing the braking of the vehicle 100 by the controller 130 because when the color of the traffic light 40 is recognized as green, the vehicle 100 can drive, and there are no pedestrians around the crosswalk 20 and the vehicle 100.

As such, the system for controlling proper departure of a vehicle on a crosswalk according to an embodiment of the present disclosure can prevent traffic accidents and protect pedestrians by preventing unauthorized departure such as signal violation or sudden start while the vehicle is stopped at a crosswalk.

In addition, the system for controlling proper departure of a vehicle on a crosswalk according to an embodiment of the present disclosure recognizes a crosswalk situation using the surround view camera provided in the parking assistance system in order to prevent unauthorized departure of the vehicle at the crosswalk, so it is possible to reduce costs associated with the provision of a separate unauthorized departure prevention device.

Figure 8:
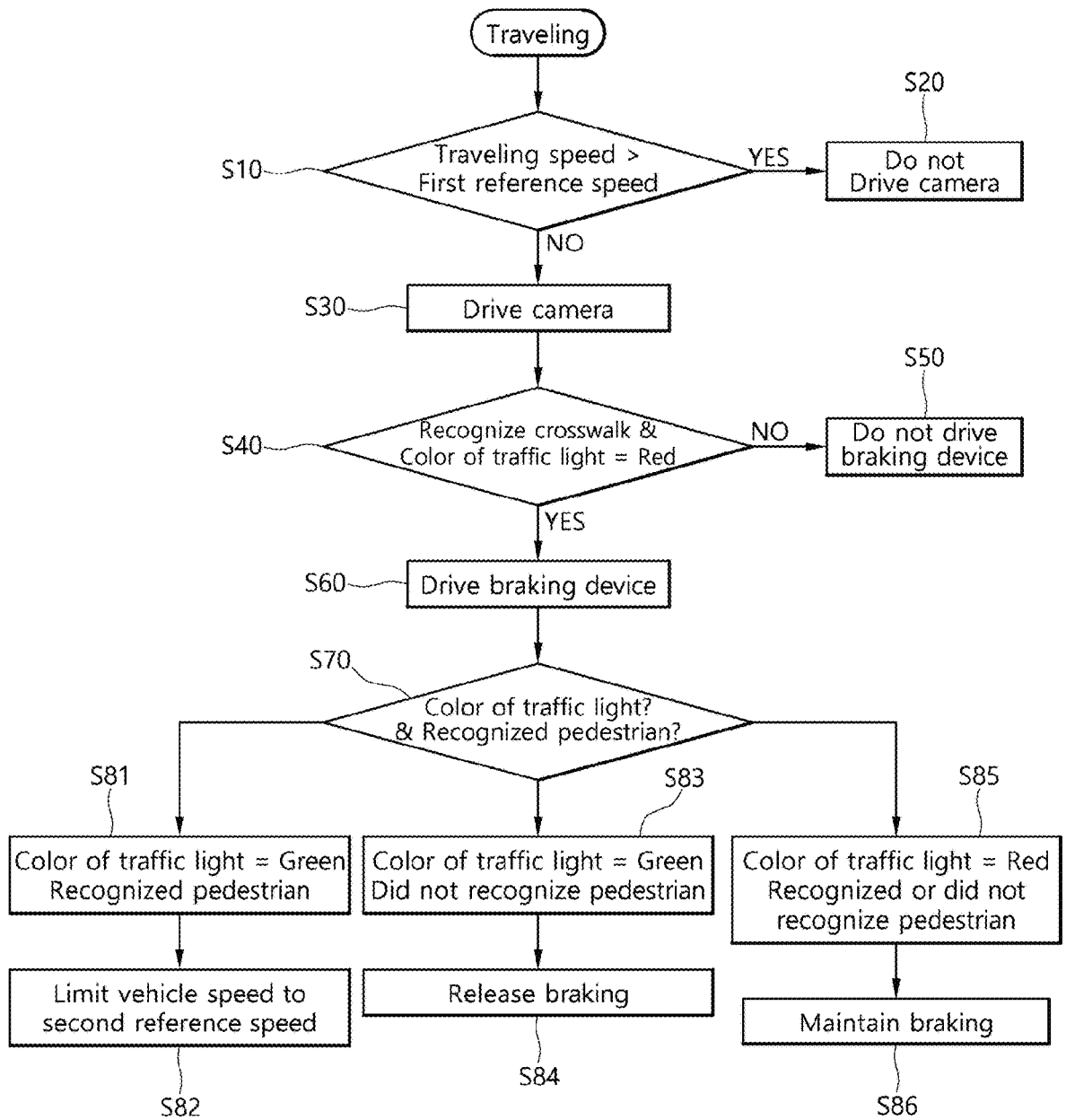
FIG. 8 is a flowchart of a control method for controlling proper departure of a vehicle on a crosswalk according to an embodiment of the present disclosure.

FIG. 8 is a flowchart of a control method for controlling proper departure of a vehicle on a crosswalk according to an embodiment of the present disclosure.

The control method for controlling proper departure of a vehicle on a crosswalk according to an embodiment of the present disclosure is a control method for controlling proper departure of a vehicle 100 on a crosswalk using a parking assistance system including a surround view camera 110 used for parking assistance by photographing objects from all directions of the vehicle 100.

Referring to FIG. 8, first, a driving state of the parking assistance system and a driving speed of the vehicle 100 are checked. In this case, when the parking assistance system is in an off state, it may be determined that the vehicle 100 is traveling.

Next, the driving speed of the vehicle 100 is compared with a first reference speed (e.g., 10 kph) at step S10.

In this case, when the parking assistance system is in an off state and the vehicle 100 travels more than the first reference speed, the surround view camera 110 is not driven (S20), and when the parking assistance system is in an off state and the vehicle 100 travels at the first reference speed or less, it is determined that the vehicle 100 is approaching the crosswalk 20 and then the surround view camera 110 is driven at step S30.

Next, when the surround view camera 110 is driven, whether the crosswalk 20 is recognized is determined based on the image captured by the surround view camera 110, and whether the color of the traffic light 40 is red is determined at step S40.

In this case, when the crosswalk 20 is not recognized or the color of the traffic light is recognized as red in the image captured by the surround view camera 110, the braking device 140 is not driven at step S50, and when the crosswalk 20 is recognized and the color of the traffic light is recognized as red in the image captured by the surround view camera 110, the braking device 140 is driven to brake the vehicle 100 at step S60.

Next, the driving of the surround view camera 110 and the controller 130 is maintained to determine the color of the traffic light 40, and whether the pedestrian 30 is recognized at step S70.

In this case, the pedestrian 30 is recognized from the image captured by the surround view camera 110, and whether the brake of the vehicle 100 is released is determined according to the color of the traffic light 40 and whether the pedestrian is recognized.

Specifically, when the color of the traffic light 40 is recognized as green and a pedestrian 30 is recognized after the vehicle 100 is braked at step S81, the speed of the vehicle 100 is limited to a second reference speed (e.g., 5 kph) at step S82.

Although the vehicle 100 can be driven when the color of the traffic light 40 is recognized as green, but nevertheless, when there is a pedestrian 30 around the vehicle 100, especially on the crosswalk 20, this is to protect the pedestrian 30 by limiting the speed of the vehicle 100.

On the other hand, when the color of the traffic light 40 is recognized as green and a pedestrian 30 is not recognized after the vehicle 100 is braked at step S83, the braking of the vehicle 100 is released at step S84.

This is to allow the driver to drive the vehicle 100 again by releasing the braking of the vehicle 100 by the controller 130 because when the color of the traffic light 40 is recognized as green, the vehicle 100 can drive, and there are no pedestrians around the crosswalk 20 and the vehicle 100.

On the other hand, when the color of the traffic light 40 is recognized as red or a pedestrian 30 is recognized after the vehicle 100 is braked at step S85, the braking of the vehicle 100 is maintained at step S86.

Since the vehicle 100 must still remain in a stopped state if the color of the traffic light 40 is recognized as red, and a pedestrian 30 may be determined to be around the vehicle 100 if the pedestrian 30 is recognized, especially on the crosswalk 20, the pedestrian 30 may be protected by preventing unauthorized departure of the vehicle 100 due to the carelessness of the driver by maintaining the vehicle 100 in a stopped state.

As such, the control method for controlling proper departure of a vehicle on a crosswalk according to an embodiment of the present disclosure can prevent traffic accidents and protect pedestrians by preventing unauthorized departure such as signal violation or sudden start while the vehicle is stopped at a crosswalk.

In addition, the control method for controlling proper departure of a vehicle on a crosswalk according to an embodiment of the present disclosure recognizes a crosswalk situation using the surround view camera provided in the parking assistance system in order to prevent unauthorized departure of the vehicle at the crosswalk, so it is possible to reduce costs associated with the provision of a separate unauthorized departure prevention device.

Although exemplary embodiments of the present disclosure have been described above, the idea of the present disclosure is not limited to the embodiments set forth herein. Those of ordinary skill in the art who understand the idea of the present disclosure may easily propose other embodiments through supplement, change, removal, addition, etc. of elements within the scope of the same spirit, but the embodiments will be also within the scope of the present disclosure.

What is claimed is:

1. An apparatus for assisting driving of a host vehicle using a parking assistance system, the apparatus comprising:
   a camera configured to capture images of objects from a plurality of directions of the host vehicle; and
   a controller communicatively connected to the camera, wherein the controller is configured to:
   recognize a crosswalk, a color of a traffic light and a pedestrian in an image captured by the camera,
   brake the host vehicle when the crosswalk is recognized and the color of the traffic light is recognized as red,
   determine whether to release braking of the host vehicle according to the color of the traffic light and whether the pedestrian is recognized, and
   release braking of the host vehicle when the color of the traffic light recognized as green and the pedestrian is not recognized after braking the host vehicle.

2. The apparatus for assisting driving of a host vehicle of claim 1, wherein the controller is further configured to drive the camera when the parking assistance system is in an off state and the host vehicle travels at a first reference speed or less.

3. The apparatus for assisting driving of a host vehicle of claim 2, wherein the controller is further configured to limit a speed of the host vehicle to a second reference speed when the color of the traffic light is recognized as green and the pedestrian is recognized after braking the host vehicle.

4. The apparatus for assisting driving of a host vehicle of claim 3, wherein the second reference speed is less than the first reference speed.

5. The apparatus for assisting driving of a host vehicle of claim 1, further comprising a display for displaying the image captured by the camera when assisting parking of the host vehicle.

6. The apparatus for assisting driving of a host vehicle of claim 5, wherein the controller is further configured to maintain the display in an off state when the parking assistance system is in an off state and the host vehicle travels at a first reference speed or less.

7. The apparatus for assisting driving of a host vehicle of claim 5, wherein the controller is further configured to drive the display when the host vehicle is braked.

8. The apparatus for assisting driving of a host vehicle of claim 7, wherein the controller is further configured to output a warning through the display or a speaker when the pedestrian is recognized as approaching the host vehicle after the host vehicle is braked.

9. The apparatus for assisting driving of a host vehicle of claim 1, wherein the controller is further configured to maintain braking of the host vehicle when the color of the traffic light is recognized as red or the pedestrian is recognized after braking the host vehicle.

10. The apparatus for assisting driving of a host vehicle of claim 1, wherein the controller is further configured to calculate a braking distance from the host vehicle to the crosswalk when the crosswalk is recognized.

11. The apparatus for assisting driving of a host vehicle of claim 10, wherein the controller is further configured to calculate the braking distance when the crosswalk is recognized and the color of the traffic light is recognized as red or yellow.

12. The apparatus for assisting driving of a host vehicle of claim 11, wherein the controller is further configured to calculate a braking time point of the host vehicle or a braking force of the host vehicle based on the braking distance.

13. The apparatus for assisting driving of a host vehicle of claim 12, wherein the controller is further configured to brake the host vehicle based on the braking time point or the braking force.

14. A method for assisting driving of a host vehicle using a parking assistance system comprising a camera configured to capture images of objects from a plurality of directions of the host vehicle, the method comprising:
 identifying a driving state of the parking assistance system and a driving speed of the host vehicle;
 driving the camera when the parking assistance system is in an off state and the host vehicle travels at a first reference speed or less;
 braking the host vehicle when a crosswalk is recognized and a color of a traffic light is recognized as red from an image captured by the camera;
 recognizing a pedestrian from the image captured by the camera; and
 determining whether to release braking of the host vehicle according to the color of the traffic light and whether the pedestrian is recognized,
 wherein the determining whether to release braking of the host vehicle comprises releasing braking of the host vehicle when the color of the traffic light is recognized as green and the pedestrian is not recognized after braking the host vehicle.

15. The method for assisting driving of a host vehicle of claim 14, wherein the determining whether to release braking of the host vehicle comprises limiting the driving speed of the host vehicle to a second reference speed, which is less than the first reference speed, when the color of the traffic light is recognized as green and the pedestrian is recognized after braking the host vehicle.

16. The method for assisting driving of a host vehicle of claim 14, wherein the determining whether to release braking of the host vehicle comprises maintaining braking of the host vehicle when the color of the traffic light is recognized as red or the pedestrian is recognized after braking the host vehicle.

17. The method for assisting driving of a host vehicle of claim 14, wherein the braking the host vehicle comprises:
 calculating a braking distance from the host vehicle to the crosswalk; and
 calculating a braking time point of the host vehicle or a braking force of the host vehicle based on the braking distance.

18. The method for assisting driving of a host vehicle of claim 17, wherein the braking the host vehicle further comprises braking the host vehicle based on the braking time point or the braking force.

19. An apparatus for assisting driving of a host vehicle using a parking assistance system, the apparatus comprising:
 a camera configured to capture images of objects from a plurality of directions of the host vehicle;
 a controller communicatively connected to the camera; and
 a display for displaying the image captured by the camera when assisting parking of the host vehicle,
 wherein the controller is configured to:
 recognize a crosswalk, a color of a traffic light and a pedestrian in an image captured by the camera,
 brake the host vehicle when the crosswalk is recognized and the color of the traffic light is recognized as red,
 determine whether to release braking of the host vehicle according to the color of the traffic light and whether the pedestrian is recognized, and
 maintain the display in an off state when the parking assistance system is in an off state and the host vehicle travels at a first reference speed or less.

* * * * *